UNITED STATES PATENT OFFICE.

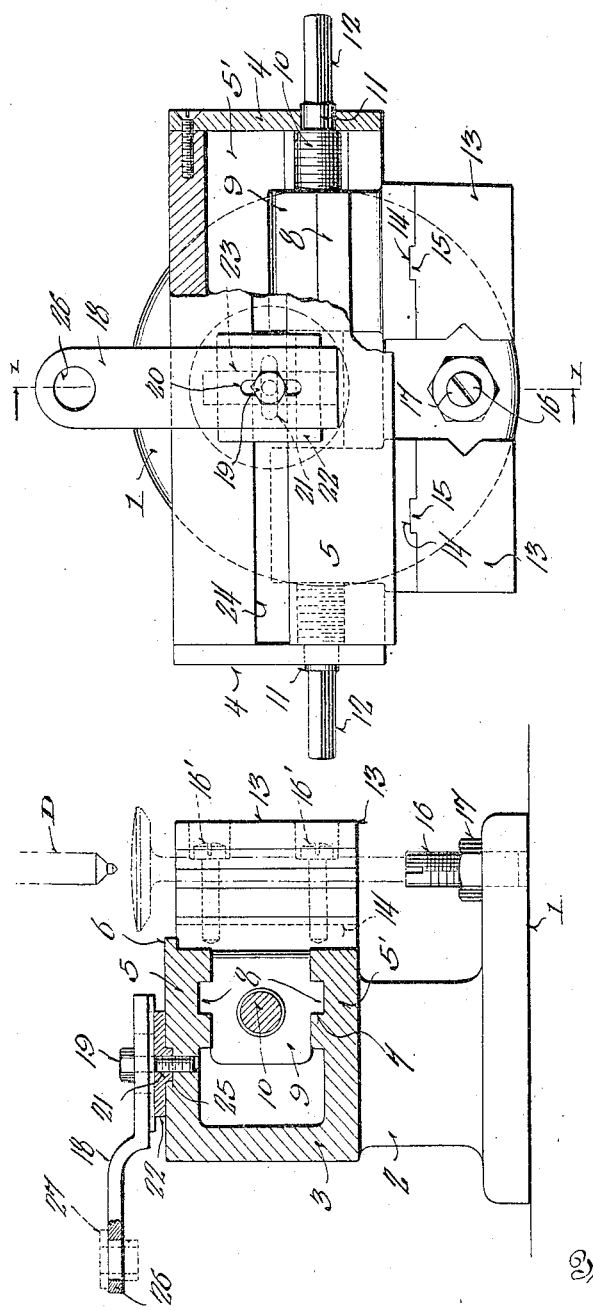

WILLIAM N. JOHN, OF MILWAUKEE, WISCONSIN.

CHUCK.

1,381,196.  Specification of Letters Patent.  Patented June 14, 1921.

Application filed August 8, 1919. Serial No. 316,202.

*To all whom it may concern:*

Be it known that I, WILLIAM N. JOHN, a citizen of the United States, and resident of Milwaukee, in the county of Milwaukee and State of Wisconsin, have invented certain new and useful Improvements in Chucks; and I do hereby declare that the following is a full, clear, and exact description thereof.

My invention relates to new and useful improvements in vises or chucks, particularly those known in the trade as box chucks. The present type of chuck is designed particularly for all classes of drill press work, such as drilling, tapping, reaming, hollow milling, spot facing and numerous other operations.

It is common to use chucks of various types in connection with drill presses, but all of them are either inadequate for the work required, or are poorly designed and are consequently relatively inefficient. One of the principal objections to standard types of chucks now in use is that the feed screw or other means for manipulating the clamp jaws is exposed, chips and shavings being thus permitted to be engaged therewith and between the screw blocks or other coöperating parts. An accumulation of dirt, chips and other foreign matter around and between the working parts obviously impairs the efficiency of the device.

Likewise in such standard chucks and vises, the feed screw or other jaw moving part is disposed beneath the jaws or located in the path of the drill or other tool, and consequently in the plane of the longitudinal axis of the work material. Thus when the vise is to grip relatively long pieces of work, it is impossible to engage the latter adjacent the point where the tool is operating thereon. Precision of operation is thereby rendered more or less impossible. A further disadvantage to be noted in this connection is that it is usually necessary in drill press work, to raise the drill upwardly an appreciable extent in order to slide the work out of the chuck, the only means for removing the same being vertically upwardly.

The purpose of the present invention is to overcome all of the defects of the standard vise or chuck and the difficulties of operation which are incidental thereto. That is to say it is an object of the invention to inclose the jaw shifting means and so arrange the housing thereof that access of chips, dirt, oil and the like is impossible. Furthermore the jaws are so positioned that they extend laterally from the shifting means, such as a feed screw, and hold the work vertically, the latter being permitted to slide vertically through the jaws without interference by the jaw shifting mechanism. The result of this is that the work may be gripped at a point close to its engagement by the drill or other tool and all possibility of inaccuracy due to springing or wabbling of the work obviated.

Another object of the invention is to provide a chuck or vise in which the work gripping jaws are simultaneously and equally moved to automatically center the work with respect thereto.

A further object is to provide, in connection with the clamp jaws, means for guiding the drill or other tool toward the work to thus increase the accuracy of operation.

An additional object is to provide a vertically adjustable work rest which coöperates with the clamp jaws and facilitates the placing of work between the latter.

A still further object is to provide clamp jaws having means for varying the type of work material engaging faces to accommodate the device for use in various classes of work.

With these and other objects and advantages in view, the invention resides in certain novel features of construction, combination and arrangement of parts which will be hereinafter more particularly described and claimed and shown in the drawing wherein:

Figure 1 represents a vertical transverse sectional view on the plane of the line 1—1 of Fig. 2, and Fig. 2 is a plan view of the device shown in Fig. 1, parts being broken away and in section to more clearly illustrate the interior construction.

As hereinbefore mentioned the invention is designed primarily for use in drill press operations, but although the drawing illustrates a vise or chuck arranged for coöperation with the drill of a drill press, it is to be understood that it is capable of use on other types of machines either with or without modification. Therefore it will be appreciated that various minor changes may be made in the form and proportion of the several parts and in the operation thereof without departing from the invention.

Referring more particularly to the drawing, the numeral 1 denotes a base, adapted to rest on a drill press table or the like, from which extends a standard 2, a housing 3 for the jaw shifting means being mounted on the upper end of the latter. This housing 3 is substantially U-shaped in cross section as seen in Fig. 1, one side being open, while the ends are closed by bearing plates 4. This provides a relatively flat housing top 5 disposed substantially parallel to the base 1; it will thus be impossible for chips and the like to drop into the interior of the housing. To further overcome the possibility of this, said top 5 is provided with an overhanging flange or lip 6 which projects outwardly therefrom and over the open side of the housing.

The top and bottom 5 and 5' respectively of the housing 3 are each provided with a longitudinally extending keyway or channel 7 in which ribs 8 projecting from opposite sides of screw blocks 9 slide. Each of the blocks has a threaded opening receiving the threaded portions of a feed screw 10, said screw being disposed substantially horizontally and longitudinally of the housing 3, its opposite end portions adjacent the ends of the threads thereon being journaled in the bearing plate 4 as shown at 11. The extreme end portions 12 of the screw are square or polygonal in cross section for the engagement of a suitable key for rotating the former. As is usual in devices of this character the threads of the screw are divided into two parts, one part being cut left-handed and the other right-handed so that rotation of the screw will simultaneously and equally move the blocks 9 either toward or away from each other.

In the present invention the blocks 9 extend outwardly of the housing 3 through the open side thereof and carry jaws 13. It will be noted that the outer face of each of the blocks 9 is substantially vertical and parallel with the longitudinal axis of the screw 10, and is provided with a channel 14 receiving a rib 15 of the jaw 13 attached thereto by the screws 16'. The work engaging faces of the jaws 13 in the present illustration are vertical and disposed toward each other as shown in Fig. 2, and thus when the work is gripped thereby it will be held vertically and laterally of the jaw moving means including the blocks 9 and the screw 10. The attachment of the jaws 13 to the blocks 9 by means of the screws 16 permits different types of jaws to be used on this device and thus accommodate various kinds of work material.

Directly below the engaging faces of the jaws when they are in abutting relation is located a work rest in the form of a vertically adjustable screw 16. This element is seated in an opening in the base 1 and is held in its several adjusted positions by a nut or the like 17. A rest of this type is convenient when work material of the same size and shape is to be continuously operated upon.

In certain classes of work it is advisable to guide the drill or other tool, therefore I have provided for use in connection with the foregoing parts of the invention, a guide arm 18 which is pivoted to the top 5 of the housing by means of a set screw 19. To procure wide range of adjustability, the arm is longitudinally, transversely and pivotally movable on the housing, the set screw 19 being disposed through a slot 20 in the arm 18 and through a similar slot 21 in a holder plate 22, after which it is threaded into the top 5 of the housing. The plate 22 has a groove extending transversely of the housing in which a rib 23 on the arm 18 slides; similarly the top 5 is longitudinally grooved as at 24 to receive a rib 25 on said plate. When the arm is out of operation it is positioned as in the accompanying drawing, but when it is adapted to be used for guiding a drill or the like D it is swung to dispose the apertured end 26 in the path of movement of the latter. Said end carries a thimble guide or the like 27 through which the drill D is fed.

In Fig. 1 of the drawing a motor valve is shown held by the invention positioned to be centered by the centering drill D. When standard types of chucks are used for holding motor valves of this type for centering, a man can center approximately five hundred of such articles in an ordinary day's work, but owing to the fact that the valve stems are gripped at a considerable distance away from the point where the drill engages, said stems become slightly bent or disalined with respect to the valve head so that a subsequent operation of straightening the stems is necessary. The cost of this straightening operation is thirty-five cents per hundred valves.

On the other hand when a chuck constructed in accordance with the present invention is used for doing the same class of work, a girl can center from two thousand to twenty-five hundred of the valves in a day's work, and furthermore the subsequent straightening operation above referred to is dispensed with. This result is procured first by the fact that the articles of work may be very quickly and easily placed in or removed from the chuck without any great movement of the drill, secondly because the work is gripped by the clamp jaws at a point very close to the engagement of the drill or other tool therewith, and thirdly because the work is automatically centered when placed and secured in the chuck. The fact that a great variety of work engaging and gripping jaws can be used with the other parts of the invention permit equally efficient results to be obtained irrespective of the class of work.

I claim:

A universal chuck comprising a supporting base, a normally vertical standard rising from the base, a normally horizontal elongated screw housing mounted on the standard and comprising parallel upper and lower plates, a side plate connecting the longitudinal edges of the upper and lower plates on one side thereof, the opposite side of the housing being open, and end plates connecting the ends of the upper and lower and side plates, a feed screw disposed in the housing parallel with the upper and lower plates and having its end portions journaled in said end plates, the free ends of the screw being projected beyond said end plates to form wrench or handle receiving portions, the feed screw on each side of its center being screw threaded in opposite directions, jaw carrying screw blocks disposed one on each of said oppositely threaded sections of the feed screw and having portions extended through said open side of the screw housing and to one side thereof, said extended portions being in sliding engagement with the adjacent longitudinal edges of said upper and lower plates, and interchangeable jaws detachably secured to the said extended portions of the screw blocks, the upper surface of said upper plate being plane and adapted to adjustably support a drill guide and to hold the same out of the way of and in parallelism with said jaws.

In testimony that I claim the foregoing I have hereunto set my hand at Milwaukee, in the county of Milwaukee and State of Wisconsin.

WILLIAM N. JOHN.